United States Patent [19]
Mayer et al.

[11] 3,867,042
[45] Feb. 18, 1975

[54] CUVETTE CONSTRUCTION
[75] Inventors: Peter Mayer, Mullheim/Baden;
Anton Heinz Sutor, Freiburg, both
of Germany
[73] Assignee: Hellma GmbH & Co.,
Mullheim/Baden, Germany
[22] Filed: June 7, 1973
[21] Appl. No.: 367,972

[30] Foreign Application Priority Data
June 19, 1972 Germany............................ 2229723

[52] U.S. Cl................................. 356/246, 250/576
[51] Int. Cl. .............................................. G01n 1/10
[58] Field of Search................... 356/181, 244, 246;
250/573, 576

[56] References Cited
UNITED STATES PATENTS
3,345,910 10/1967 Rosin et al...................... 356/246 X
3,508,837 4/1970 Hrdina............................... 356/246
3,514,210 5/1970 Hrdina............................... 356/246
3,518,008 6/1970 Skeggs............................... 356/181
3,560,099 2/1971 Boe et al........................... 356/246

Primary Examiner—Ronald L. Wibert
Assistant Examiner—F. L. Evans
Attorney, Agent, or Firm—Michael S. Striker

[57] ABSTRACT

A cuvette for measuring the properties of incremental portions of a liquid stream which are separated by gas bubbles. The cuvette housing has an inlet and an outlet for liquid to be measured, and a measuring channel is provided within the housing for receiving liquid from the inlet and measuring its properties. A bubble separating arrangement is also provided within the housing, being located upstream of the measuring channel for separating gas bubbles from the liquid before the latter enters the measuring channel.

14 Claims, 7 Drawing Figures

CUVETTE CONSTRUCTION

BACKGROUND OF THE INVENTION

The present invention relates generally to a cuvette construction, and more particularly to a cuvette for measuring the properties of incremental portions of a liquid stream which are separated by gas bubbles.

Still more particularly, the present invention relates to a cuvette for performing photometric and/or spectrophotometric measurements of such liquid.

There are instances where it is necessary to measure incremental portions of a liquid stream which are separated by gas bubbles. The purpose is to measure particular properties of the liquid of each portion, and the properties may vary from portion to portion. For instance, the color or other characteristics may vary, and these portions are separated by gas bubbles which are present in the stream at approximately equal distances from one another. Details why and how such gas bubbles come to be present, and what particular characteristics are measured, are of no particular consequence for the understanding of the present invention, but are in any case well known per se to those skilled in the art.

What is important, however, is that before each incremental portion of the liquid stream can enter the measuring channel of the cuvette wherein its properties or characteristics are measured, the gas bubble preceding it must be separated. Such gas bubbles must not be permitted to enter into the measuring channel. The prior art has solved this problem by arranging upstream of (i.e., ahead of) the cuvette a bubble separator or de-bubbler which provides for the removal of the bubbles from the liquid. While this does effectively eliminate any possibility that the bubbles might enter the measuring channel of the cuvette, it has a decisive disadvantage in that downstream of the bubble separator — that is between the same and the inlet to the cuvette — a partial admixture of the two incremental portions of the liquid stream, which were previously separated by the removed bubble, may take place. Quite evidently, this will result in a falsification of the measurement taken because the values measured for two successive increments will no longer be those specific to each increment, but will be a result of characteristics obtained by mixing the liquid of the two increments. Further problems may occur in that at certain points of flow resistance, for instance at a hose connection between the bubble separator and the hose which connects the same with the cuvette, portions of liquid of a higher concentration may be retained so that the concentration of a liquid in an increment having lower concentration will be changed and measurement correspondingly thrown off.

SUMMARY OF THE INVENTION

It is, accordingly, a general object of the invention to overcome the disadvantages of the prior art.

More particularly, it is an object of the present invention to provide an improved cuvette of the type outlined above, in which any admixture of the liquid of two successive incremental portions of a liquid stream is reliably avoided after the gas bubble which had previously separated these incremental portions has been removed by a bubble separator. This facilitates greater accuracy of measurements of the particular characteristics of the liquid in each incremental portion.

An additional object of the invention is to provide such an improved cuvette which is rather simple in its construction and inexpensive to produce.

In keeping with these objects and with others which will become apparent hereafter, one feature of the invention resides in a cuvette for measuring the properties of incremental portions of the liquid stream which are separated by gas bubbles. The cuvette comprises a housing having an inlet and an outlet for liquid to be measured. A measuring channel is provided within the housing for receiving liquid from the inlet and measuring the properties of such liquid. A bubble separating means is also provided in the housing of the cuvette upstream of the measuring channel and separates gas bubbles from the liquid before the latter enters the measuring channel.

With this construction the path to be traversed by the liquid from the bubble separating means to the measuring channel of the cuvette is drastically shortened as opposed to the prior art, because the bubble separating means is now located in one and the same housing with the measuring channel, that is within the cuvette. An undesired admixing of the liquids of two successive incremental portions, after the bubble previously separating them has been removed, is therefore largely avoided. Furthermore, there are now no longer any connections necessary between the bubble separating means and the cuvette, and this eliminates the further source of measuring error which has been outlined above.

A particularly advantageous construction of the cuvette according to the present invention provides for the bubble separating means to be constructed as a chamber through which the liquid with the gas bubbles therein must pass. At the other side of this chamber, where both the inlet and the outlet for the chamber are located, there is a wall portion which diverges in such a manner that the cross section of the chamber increases in the direction from the inlet towards its outlet. Downwardly of this region, the chamber is provided with an aperture communicating it with the measuring channel of the cuvette. In this construction, the measuring channel as well as the bubble separating means can be very simply accommodated in the cuvette requiring only very little space and permitting the path to be traversed by the liquid between the bubble separating means and the measuring channel to be very short, and in fact as short as short as the designer may desire.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 3:
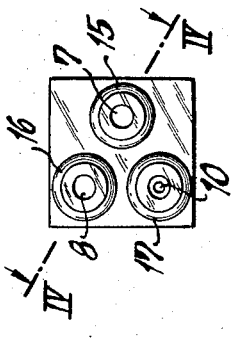
FIG. 3 is a top-plan view of the novel cuvette.
Figure 4:
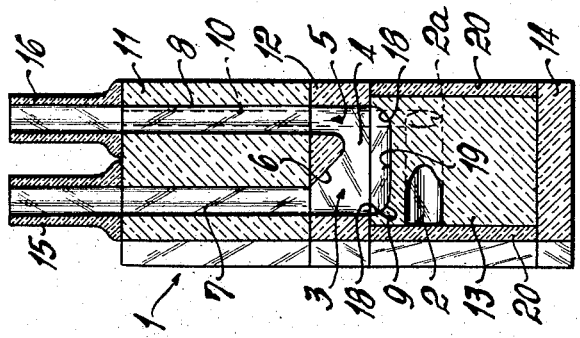
FIG. 4 is an inclined longitudinal section taken on line IV—IV of FIG. 3.
Figure 5:
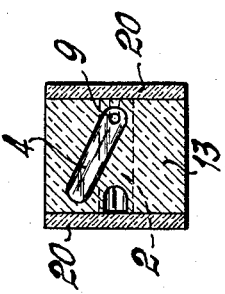
FIG. 5 is a cross-section taken on line V—V of FIG. 2.

Discussing the drawing in detail, and firstly referring to FIGS. 1 – 5 thereof, it will be seen that the cuvette according to the present invention is designated in toto with reference numeral 1. It will be understood that its serves for photometric and/or spectrophotometric measurements of incremental portions of a liquid stream, which portions are initially separated by gas bubbles which must be removed before the liquid of a particular portion can be measured. The cuvette has a measuring channel 2 wherein the measurements are obtained, and the gas bubbles must be removed before the liquid enters this channel, and must not themselves be allowed to enter into the channel In accordance with the present invention, the bubble separating means 3 required for removal of these gas bubbles is located within the housing of the cuvette 1 itself. This is particularly clearly shown in FIG. 4, where it will be seen that the bubble separating means 3 utilizes a chamber 4 into which the bubble-carrying liquid stream enters at the inlet 5 and from which it exits in part at the outlet 7. An upper wall portion bounding the chamber 4 recesses or diverges in the direction from the inlet 5 towards the outlet 7 so that the cross section of the chamber increases in that same direction. FIG. 5 shows the location of the chamber 4 with reference to the cross section of the cuvette housing 1.

Figure 1:
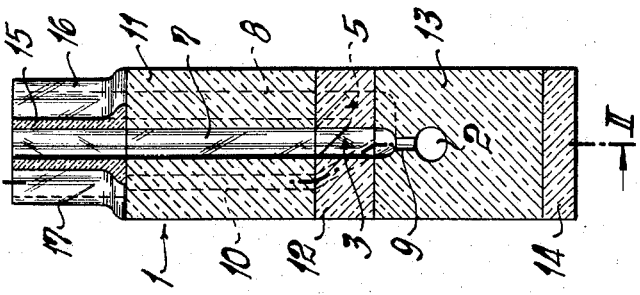
FIG. 1 is a longitudinal section through a cuvette taken on line I—I of FIG. 2.
Figure 2:
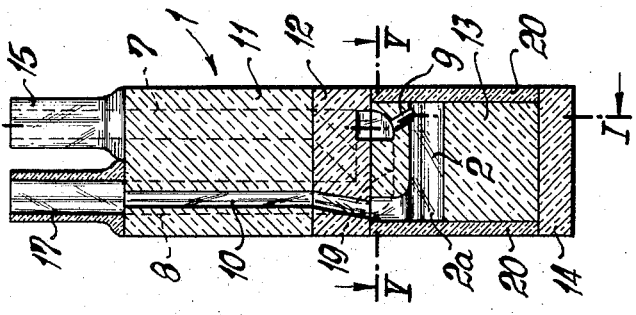
FIG. 2 is a further longitudinal section through the cuvette, taken on line II—II of FIG. 1.

The liquid having the gas bubbles therein enters through a channel 8 and flows through the same into the inlet 5 to enter the chamber 4. In the chamber 4, downwardly of the enlargement of its cross section which is caused by the receding upper wall portion, there is formed an aperture 9 (e.g. a bore) which communicates the chamber 4 with the measuring channel 2. Since the aperture or bore 9 is somewhat inclined as FIG. 2 shows, it is only partially visible in FIG. 4. The cross section of the aperture or bore 9 is smaller than the narrowest cross section of the bubble separating means 3 and/or the channel 8. This assures that no portion of a gas bubble can enter through the aperture 9 into the measuring channel 2 where it would disadvantageously influence the measurements taken. Rather, the gas bubbles and a part of the incoming liquid will flow out of the chamber 4 through the outlet 7, whereas the remainder of the liquid will enter through the aperture 9 into the measuring channel 2 so that measurements can be taken therein.

The measuring channel 2 communicates at one of its end portions, that is the upstream one, with the aperture 9 which latter may, for instance, have a diameter of approximately 1 mm. The other end portion of the measuring channel 2 is remote from the aperture 9 and designated with reference numeral 2a. At this end portion it has its own outlet 10 whose cross section is preferably smaller than that of the inlet channel 8. The measuring channel itself may, but need not, have a cross section which is also smaller than that of the inlet channel 8. Furthermore, the measuring channel may diverge conically in its cross section in the direction from the aperture 9 towards the end portion 2a.

These steps assure that the path from the bubble separating means to the channel 2, and the flow speed of the liquid in the region of the aperture 9 and of the measuring channel 2, are such that an admixture of the incremental portions of the liquid stream which have been previously separated by a gas bubble which has been removed by the bubble separating means 3, can to all intents and purposes not occur.

Figure 7:
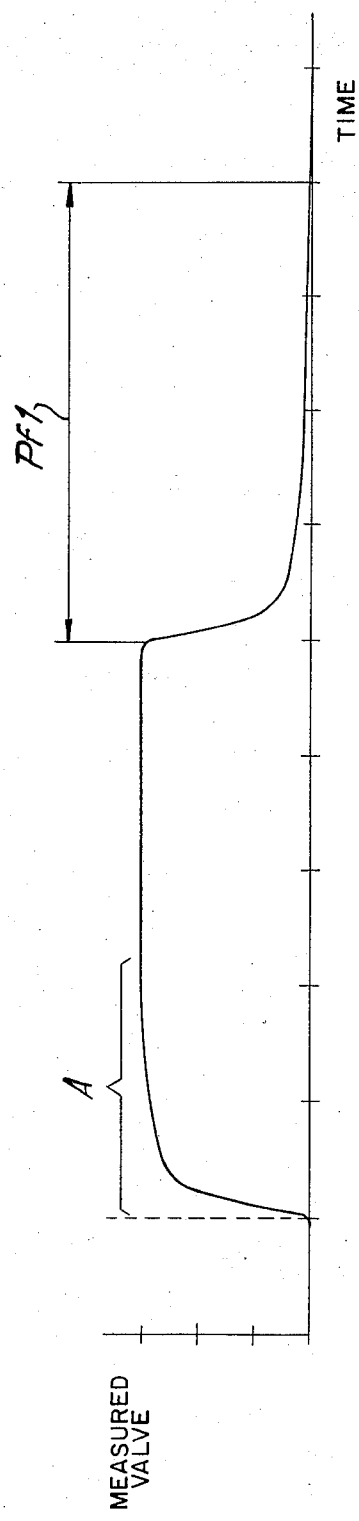
FIG. 7 is a view analogous to FIG. 6 but illustrating the measurements obtained with a cuvette according to the prior art, wherein a separate external bubble separating means is employed.

A reference to FIG. 7 will indicate that if a certain admixture of such successive incremental portions of a liquid stream were to be permitted, a relatively rapid change in the concentration in the liquid to be measured, or a rapid addition of a coloring agent, would result in a measurement of the full value of the changed concentration or the changed color only after a relatively long period of time. Similarly, when the concentration would change back or the addition of coloring matter would be terminated, it would take a long period of time before these changes would be reflected in the measurements, as indicated by the length of the arrow P$f$1 in FIG. 7. The measurements in FIG. 7 are based upon a cuvette of the prior art in which a separate bubble separating device is utilized which is located exteriorly of the cuvette and is connected with the same by a suitable conduit.

Figure 6:
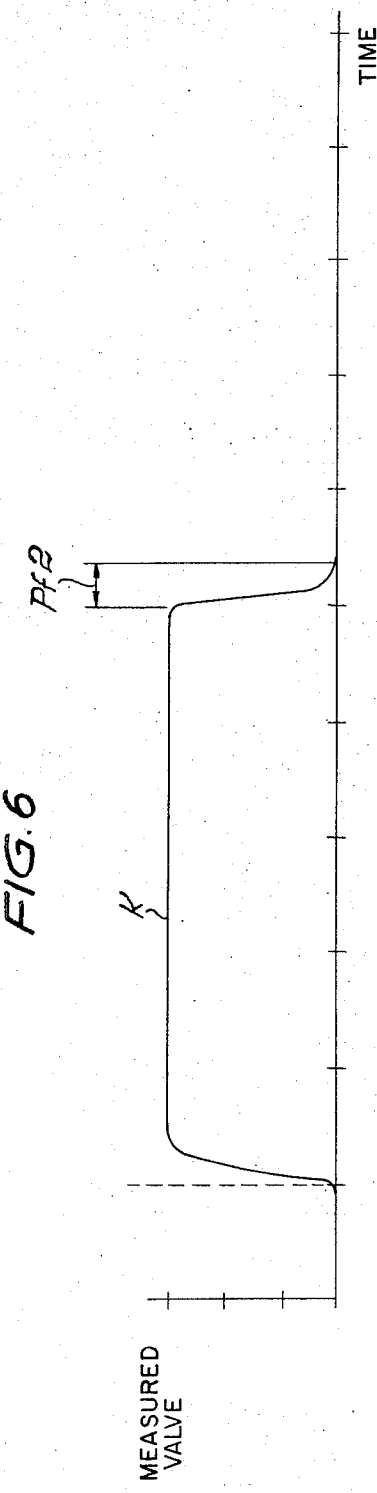
FIG. 6 is a somewhat simplified diagram illustrating measurements obtained with a cuvette according to the present invention wherein the bubble separating means is incorporated in the cuvette.

Comparing FIG. 7 with FIG. 6 the latter indicating measurements taken with a cuvette according to the present invention, it will be seen that the elimination or almost complete elimination of admixture of successive liquid portions prevents the different characteristics of these liquid portions from influencing one another. The result is that when, for instance, an increase in concentration or in the admission of coloring matter to the liquid is terminated, the measurement of the termination and return to a previous characteristic can be measured very rapidly as indicated by the length of the arrow P$f$2. The rise at the beginning of the curve K is steep and very rapidly reaches the maximum value, without having a relativley flat component up to the maximum concentration, as is the case in the region A of FIG. 7. In other words, measurements taken with the cuvette according to the present invention are substantially more accurate than those taken with the prior-art constructions, as will be readily apparent from a comparison of the two arrows P$f$1 and P$f$2.

The cuvette in the illustrated embodiment is assembled of four stacked portions 1, 12, 13 and 14 on which there is mounted an inlet nipple 16, for the channel 8 and two outlet nipples. The one outlet nipple is designated with reference numeral 15 and communicates with the outlet 7 of the chamber 4, and the other outlet nipple is designated with reference numeral 17 and communicates with the outlet 10 of the channel 2.

If the channel 2 conically diverges in the direction towards the outlet 10, the lower edge of the bore forming the channel continues as before to extend in parallelism with the lower edge of the cuvette 1 itself, so that a somewhat lesser cross section is present at the upstream end of the measuring channel whereby in this region the danger of the admixture of successive incremental portions of a liquid is further reduced.

The chamber 4 is bounded, as shown particularly clearly in FIG. 4, by rounded edges where its wall portions merge with one another. These rounded edges or portions 18 which are provided between the bottom wall portion 19 and the side walls of the chambers, are formed in a part 13 of the cuvette housing 1, on which the part 12 of the cuvette housing is stacked, with the part 12 having the upper portion of the chamber 4 with the inclined upward wall portion, the inlet and the outlet.

The measuring channel 2 and the aperture 9 are also provided in an part 13, which in addition has the optical window 20 which closes the measuring channel 2 at one side to permit observation and measurements of the liquid passing through the channel.

The portion 14 of the cuvette housing 1 is located beneath the portion 13 and is configured as a bottom plate whose height can be accommodated (using different plates) to the individual photometric or other devices. The inlets and outlets are in the upper portion 11 of the cuvette which is stacked on top of the portion 12 and on which the various inlet and outlet nipples are secured by suitable means, for instance by adhering them in thermo-plastic state if the cuvette and the nipples are made of glass.

The cross section of the cuvette 1 is approximately quadratic in the illustrated embodiment, as shown in FIG. 3. To be readily accommodated to conventional commercial photometric and/or spectrophotometric devices, it may have outer dimensions of approximately 12.5 by 12.5 by 45 mm. Of course, these dimensions are exemplary only.

At least the portions 12 and 13 which have the chamber 4 and the measuring channel 2 may be of black-colored material, except of course for the optical window or windows 20, in order to provide improved accuracy of the measurements which are taken.

It should be understood that in particular the combination of the bubble separating means 3 located within the cuvette 1, with the relatively small-cross-section passage 9, communicating with chamber 4 of the separating means 3 with the measuring chamber 2, and the location of channel 2 closely adjacent to this chamber, affords the possibility of providing for a very accurate and rapid measurement of changes in the characteristics of incremental portions of a liquid stream which were initially separated by gas bubbles. For instance, in the case of examination of blood or in other instances, this rapid and exact measurement is frequently of great importance, because there are many instances where it is necessary to measure as precisely as possible the exact beginning and the exact end of a change in the characteristic of the liquid, for instance any change of a concentration in the liquid, which as shown in FIG. 7 was only inadequately possible in the prior art.

It will be understood that each of the elements described above, or two or more together, may also find a useful application in other types of constructions, differing from the types described above.

While the invention has been illustrated and described as embodied in a cuvette construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims:

1. A cuvette for measuring the properties of incremental qualities of liquids, comprising inlet means for receiving the incremental quantities of liquids to be measured, which are separated by gas bubbles; outlet means for withdrawing the liquids and the gas; and wall means defining a measuring channel having an input end and an output end communicating with said outlet means, and a separation chamber having an inlet end communicating with said inlet means, and an outlet end spaced from said inlet end, the latter wall means including a substantially horizontal bottom wall provided with an aperture communicating said outlet end of said chamber with said input end of said channel, and a top wall diverging from said bottom wall in direction from said inlet end to said outlet end, said top wall being provided in the region of said outlet end with an outlet communicating with said outlet means, whereby said bubbles upon entering said chamber through said inlet means follow a path along said top wall and through said outlet into said outlet means due to their buoyancy, while at least a substantial portion of any rspective incremental quantity of liquid follows a liquid path from said inlet end to said outlet end of said chamber and through said aperture into said measuring channel.

2. A cuvette as defined in claim 1, wherein said outlet means includes a discharge opening communicating with said output end of said measuring channel, said discharge opening being separate from said outlet for separately conducting the liquid passing through said measuring channel from the gas and the remainder of said liquids discharged through said outlet.

3. A cuvette as defined in claim 1, wherein the cross-section of said aperture is smaller than the smallest cross-section of said chamber.

4. A cuvette as defined in claim 3, wherein the diameter of said aperture is substantially 1 mm.

5. A cuvette as defined in claim 1, wherein the cross-section of said aperture is smaller than that of said inlet means.

6. A cuvette as defined in claim 2, wherein said discharge opening has a cross-section which is smaller than that of said inlet means.

7. A cuvette as defined in claim 1, wherein said wall means constitutes a housing composed of four superimposed portions and provided with an inlet nipple and two outlet nipples.

8. A cuvette as defined in claim 2, wherein said measuring channel diverges conically in direction towards said discharge opening.

9. A cuvette as defined in claim 1, wherein said wall means defining said chamber has a plurality of other walls which form rounded junctions with one another.

10. A cuvette as defined in claim 9, wherein said wall means constitutes a housing which includes one part having a portion of said chamber including said bottom wall and side walls thereof which form said rounded junctions, and an other part stackable on said one part and having a portion of said chamber including said top wall thereof.

11. A cuvette as defined in claim 10, wherein said one part is also formed with said measuring channel and said aperture; and further comprising an optical window formed in said one part and associated with said measuring channel.

12. A cuvette as defined in claim 11; further comprising an additional part of said housing in form of a plate arranged beneath said one part.

13. A cuvette as defined in claim 12, wherein at least said one and said other part are of black material except for said optical windows.

14. A cuvette as defined in claim 1, wherein said wall means constitutes a housing of substantially quadratic cross-section and having outer dimensions of substantially 12.5 by 12.5 by 45 mm.

* * * * *